United States Patent
Nelsen

[11] Patent Number: 6,081,976
[45] Date of Patent: Jul. 4, 2000

[54] BELT SHORTENING DEVICE

[75] Inventor: Daniel J. Nelsen, Providence, R.I.

[73] Assignee: Sunshine Kids Juvenile Products, LLC, Naples, Fla.

[21] Appl. No.: 09/432,520

[22] Filed: Nov. 3, 1999

[51] Int. Cl.[7] ............................. A44B 21/00; B25B 25/00
[52] U.S. Cl. ...................... 24/685 B; 24/909; 24/68 CD; 254/223; 242/378.1; 242/388.1
[58] Field of Search ............................... 24/68 CD, 68 E, 24/68 SB, 68 BT, 71.1, 71.2, 269, 572, 909, 910; 410/97, 100, 103; 254/213, 218, 217, 223; 242/378.1, 388.1, 378.2; 297/250.1, 463.1

[56] References Cited

U.S. PATENT DOCUMENTS

| | | |
|---|---|---|
| 482,035 | 9/1892 | Buckingham . |
| 547,760 | 10/1895 | Bickel . |
| 799,767 | 9/1905 | Weisenborn . |
| 3,549,203 | 12/1970 | Rawson ................................. 24/572 X |
| 3,574,342 | 4/1971 | Berns ...................................... 254/79 |
| 3,749,366 | 7/1973 | Brucker ................................. 254/164 |
| 4,159,084 | 6/1979 | Mori et al. ........................... 242/378.1 |
| 4,163,530 | 8/1979 | Kondo et al. ....................... 242/378.1 |
| 4,510,652 | 4/1985 | van Iperen ........................... 24/68 CD |
| 4,604,773 | 8/1986 | Weber et al. .......................... 27/71.2 |
| 4,823,443 | 4/1989 | Waters ................................. 24/68 CD |
| 4,860,606 | 8/1989 | Rousseau ................................ 74/157 |
| 4,913,608 | 4/1990 | Royball ................................. 410/103 |
| 4,922,582 | 5/1990 | Flanigan ................................. 24/71.1 |
| 5,103,536 | 4/1992 | Kamper ................................ 24/68 CD |
| 5,426,827 | 6/1995 | Tracy et al. ............................. 24/68 R |
| 6,000,736 | 12/1999 | Leon et al. ............................ 24/909 X |

*Primary Examiner*—James R. Brittain
*Assistant Examiner*—Robert J. Sandy
*Attorney, Agent, or Firm*—Barlow, Josephs & Holmes, Ltd.

[57] ABSTRACT

A belt shortening device intended for use with a vehicle seat belt securing a baby seat in a vehicle is constructed and arranged so that it is easily mounted to the existing seat belt without detaching the belt from its existing connection. The device includes a flat, rectangular housing having spaced slots extending across the top wall, and further includes first and second take up arms slidably mounted within the housing. The take up arms each consist of a body portion having inner and outer ends, and an elongated rack member having a first end pivotably mounted to the inner end of the body portion. The outer ends of the body portions of the take up arms include a transverse slot for receiving the seat belt therein. The take up arms are movable within the housing between an extended position wherein the outer ends of the take up arms extend outside of the housing through the slots, and a withdrawn position wherein the outer ends of the take up arms are withdrawn inside the housing. Movement of the rack members is controlled by a pinion gear mounted on a shaft that extends through the interior or the housing. An exterior end portion of the shaft has a handle to facilitate rotation of the shaft. A ratchet pawl engages the rack members within the housing for selectively locking the rack members in a fixed position.

4 Claims, 7 Drawing Sheets

BELT SHORTENING DEVICE

BACKGROUND AND SUMMARY OF THE INVENTION

The present invention relates generally to a device that is used to take up slack, or shorten, a length of belt webbing. More specifically, the present invention relates to devices suitable for taking up slack, or shortening, a seat belt webbing in a vehicle. The device is particularly suitable for the removal of slack from a seat belt webbing used to retain a baby seat in place on a supporting vehicle seat.

In the prior art, lengths of belt material or webbing are commonly used to retain a structure in place. For example, belts are frequently used to retain stacked articles in place on a pallet. Belts are also provided on the seats of vehicles to secure a seated occupant in place for safety purposes. In connection with the present invention, existing seat belts in vehicles are often used to secure a baby seat to the supporting vehicle seat. Typically, the seat belt is passed through an opening in the baby seat and secured with the end buckle in a normal manner. When securing a baby seat in a vehicle, especially for use with a small infant, it is critical that the baby seat be securely and snugly positioned on the seat, and it is further critical that the back support of the seat be oriented at desired angle. Proper positioning of the seat will more effectively distribute the baby's weight, and better support an infant's neck in an impact. While the existing seat belt is effective for retaining an adult passenger in place on the seat, when the belt is used with a baby seat, it often has unwanted slack which decreases the effectiveness of the belt's ability to secure and retain the baby seat in its proper position and orientation on the seat.

To address the inherent problem of slack in retaining belts, there have been many attempts in the prior art to reduce or eliminate such slack. For example, shortening devices including ratcheted spindles have been available in the prior art. The belt webbing is typically routed around the spindle and then wound about the spindle with the assistance of the ratchet. The ratchet provides leverage and locking to enable the belt to be tightened and released as desired. Also, spring clips have been provided to grip excess portions of the belt to thereby shorten the belt. However, these prior art devices suffer from many disadvantages which makes them undesirable to use. For example, the prior art shortening devices commonly require that a free end of the belt be routed through the shortening device to enable winding of the belt by the device to effectuate shortening. This is not particularly advantageous in a vehicle seat belt because a vehicle seat belt includes a large buckle on the end. To be routed through the interior of a shortening device, the device would have to have a rather large housing and would have to accommodate the large buckle and still be able to grasp the thin belt. Other devices permanently incorporate the ratchet take-up mechanism directly on the belt itself. Permanently mounted shortening devices such as these are commonly used on special belt systems for retaining articles on a pallet. As can be understood, a permanently mounted shortening device is not needed for vehicle owners who do not have small children or who have grown children. The provision of such devices as a standard vehicle option would be both costly and unnecessary.

In view of the foregoing, there is a demand for a compact, inexpensive and removable belt shortening device that is well suited for shortening vehicle seat belts. There is a particular demand for such a belt shortening device that can be easily fitted to an existing seat belt webbing without disengaging the existing belt connection.

In this regard, the present invention preserves the advantages of prior art belt shortening devices while, in addition, overcoming many disadvantages of such currently available devices and providing the necessary features not found in currently available devices. As indicated above, the belt shortening device of the present invention is intended for use with a vehicle seat belt that is used to secure a baby seat within a vehicle. The present belt shortening device is particularly constructed and arranged so that it can be easily mounted to an existing vehicle seat belt without detaching the belt from its existing connection. More specifically, the belt shortening device includes a flat rectangular housing having spaced transverse slots extending across the top wall. The device further includes first and second take up arms slidably mounted within the housing. The take up arms each consist of a body portion having inner and outer ends and an elongated rack member having a first end pivotably mounted to the inner end of the body portion. The outer end of the body portion includes a transverse slot for receiving a seat belt therein. The respective rack members extend longitudinally in opposing directions within the housing. The take up arms are movable within the housing between an extended position wherein the outer ends of the take up arms extend outside of the housing through the slots in the top wall and a withdrawn position wherein the outer ends of the take up arms are withdrawn inside the housing. Movement of the racks is controlled by a pinion gear mounted on a rotatable shaft that extends transversely through the interior or the housing, The shaft has an end portion that extends out of the housing, the end portion of the shaft having a handle mounted thereon to facilitate rotation of the shaft and pinion gear and linear movement of the rack members within the housing. A locking ratchet pawl releasably engages the rack members for selectively locking the rack members in a fixed position. The ratchet pawl is selectively movable between the engaged position and a release position to release the belt when desired.

In use, the take up arms are moved to the extended position and the seat belt is transversely received within the slots of the take up arms outside the housing. Thereafter the shaft is rotatable relative to housing to slidably move the rack members within the housing and withdraw the body portions of the take up arms into the housing to take up excess slack in the belt. The ratchet pawl holds the rack members in place to prevent inadvertent loosening of the belt. When it is desired to release the belt shortening device, the pawl is moved to the release position and the rack members are free to move back to their extended positions.

Accordingly, it is an object of the present invention to provide a belt shortening device that can remove unwanted slack in a vehicle seat belt that it used to secure a baby seat in a vehicle.

It is another object of the present invention to provide a belt shortening device that can be easily fitted to an existing seat belt webbing without disengaging the existing belt connection.

It is still another object of the invention to provide a belt shortening device that is easily mounted over the side edge of the belt.

It is yet another object of the invention to provide a belt shortening device including a rack and pinion tightening mechanism to draw slack portions of the belt into a housing.

It is still another object to provide a belt shortening device that does not require any additional webbing or additional buckles.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
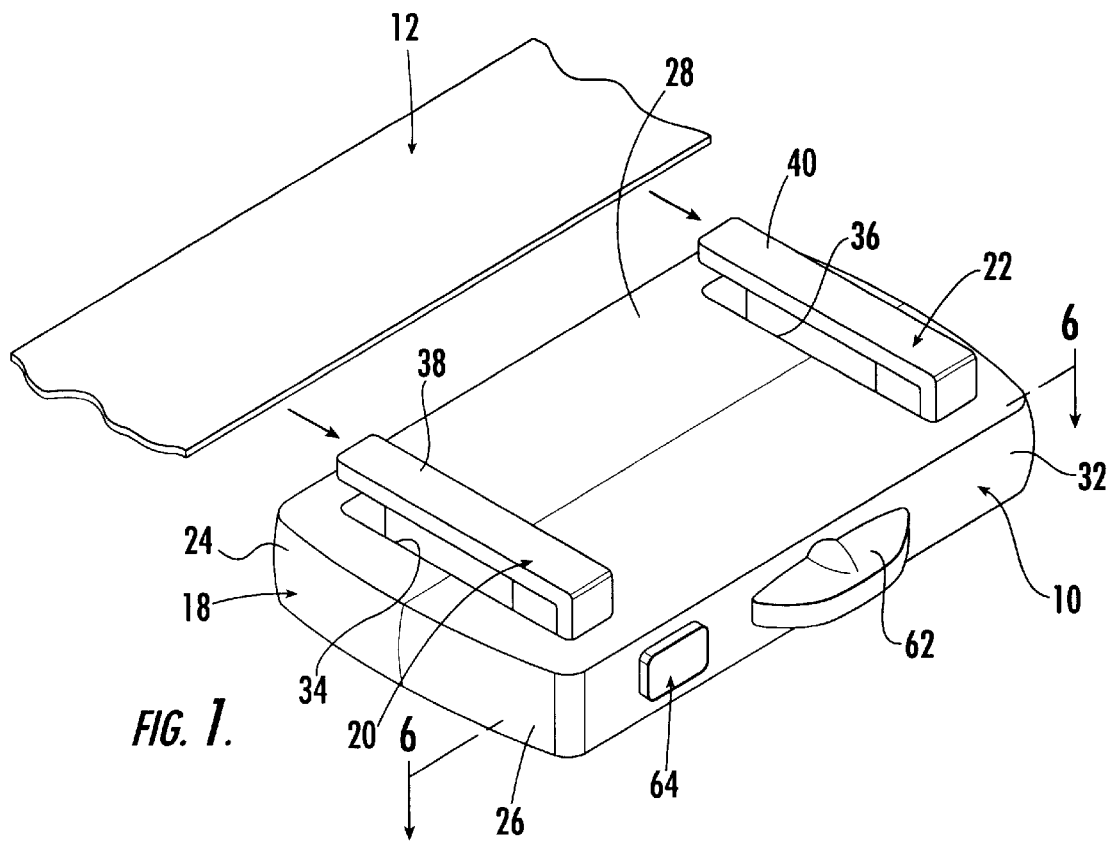
FIG. 1 is a perspective view of a belt shortening device constructed in accordance with the teachings of the present invention.
Figure 2:
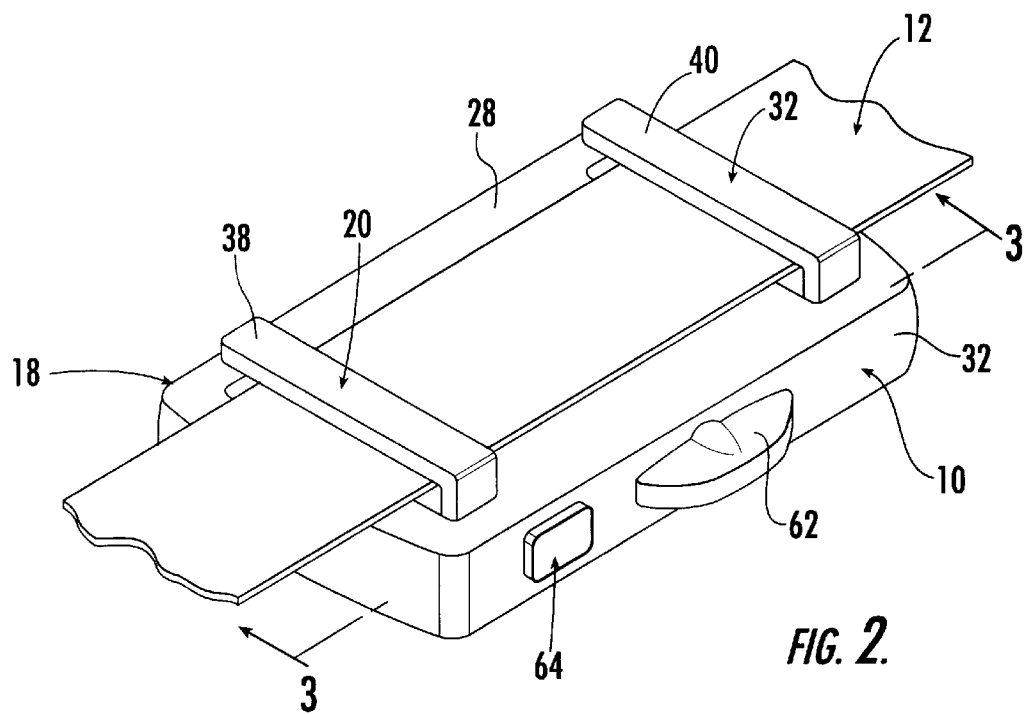
FIG. 2 is another perspective view thereof showing a seat belt fully inserted under the take up arms.
Figure 3:
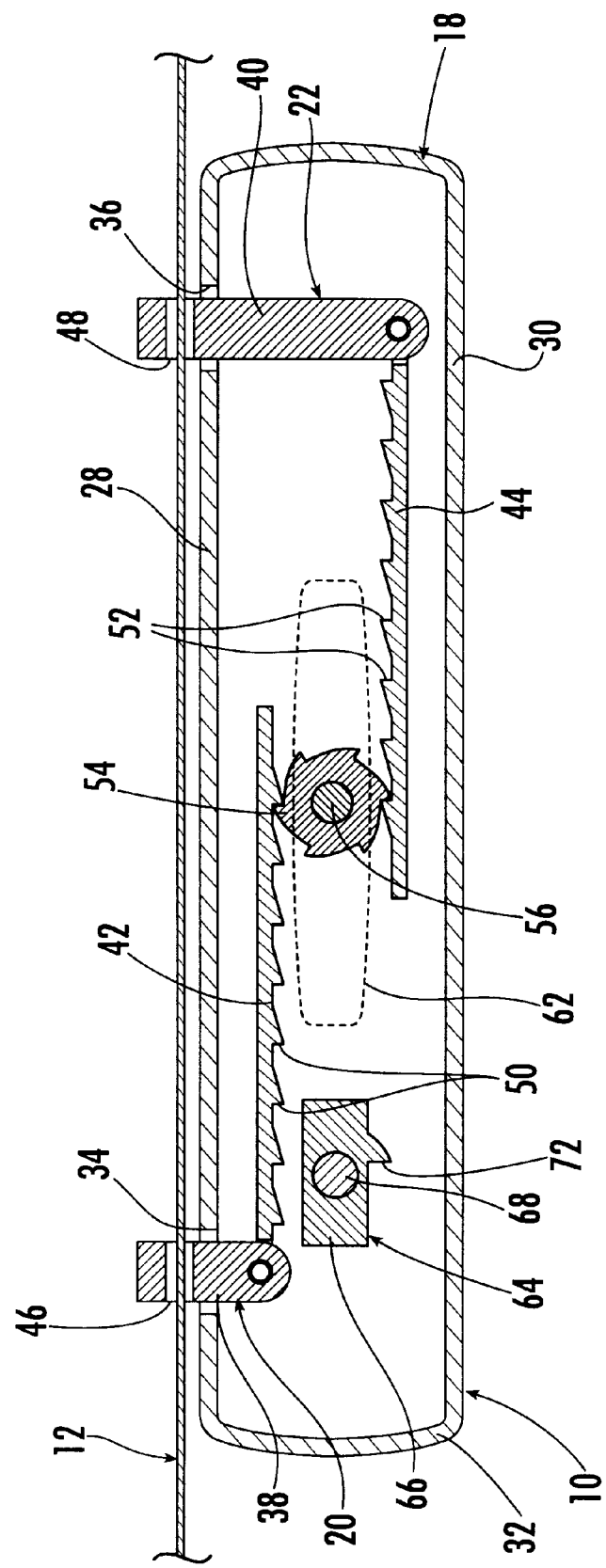
FIG. 3 is a cross section view thereof as taken along line 3—3 of FIG. 2.
Figure 4:
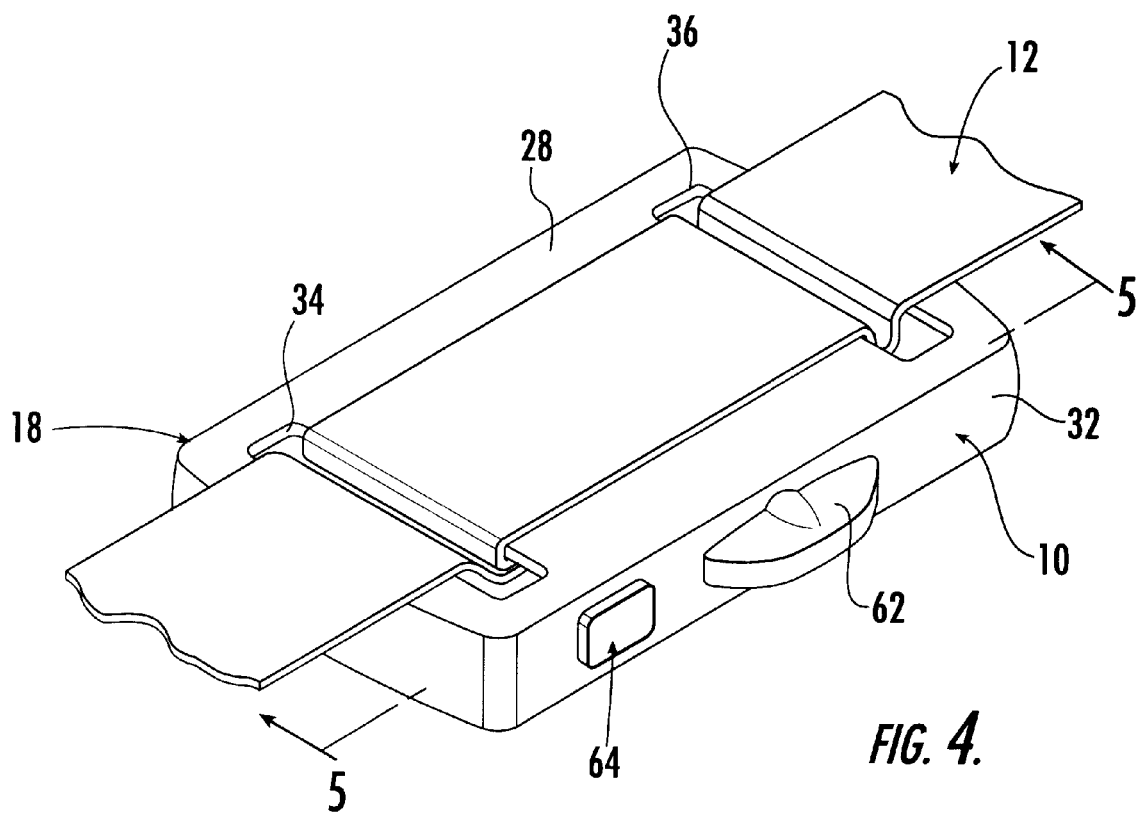
FIG. 4 is another perspective view showing partial rotation of the spindle to draw the take-up arms into the housing.
Figure 5:
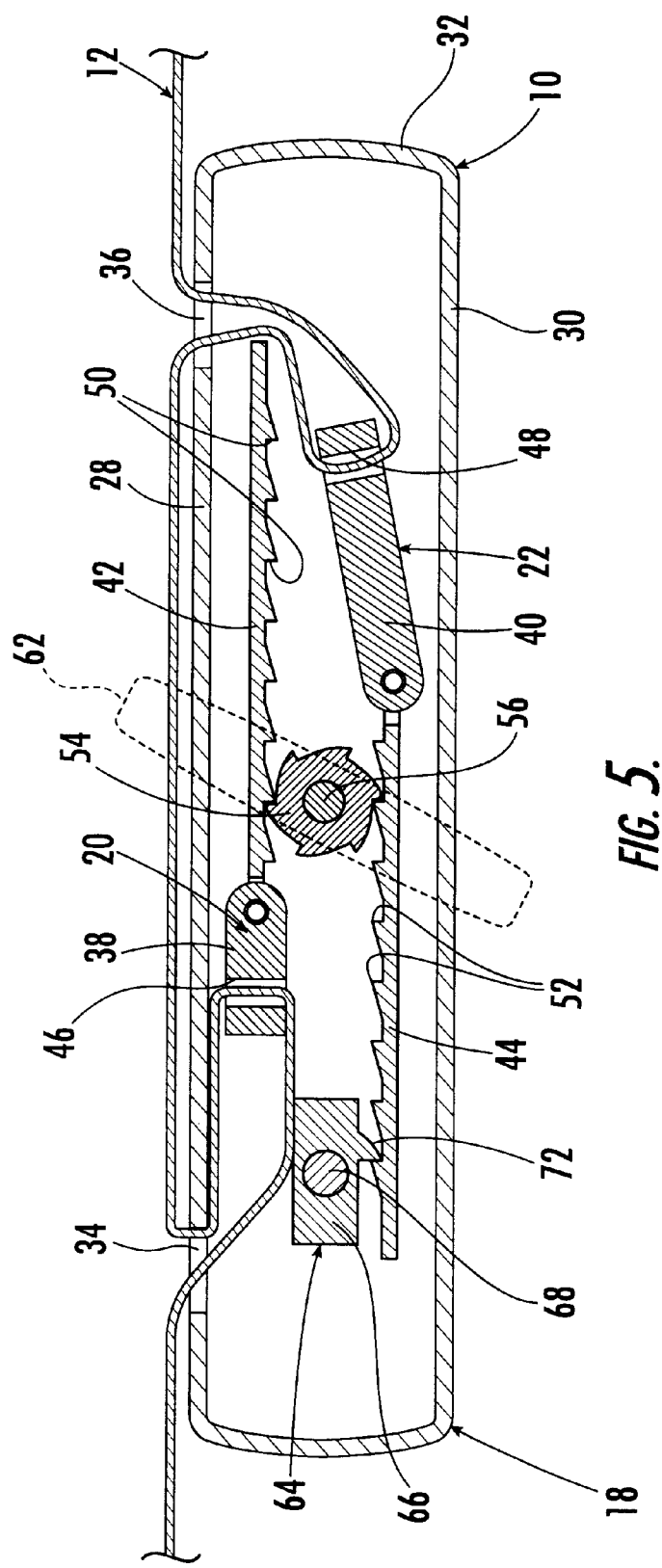
FIG. 5 is a cross-sectional view thereof as taken along line 5—5 of FIG. 4.

Referring now to the drawings, the belt shortening device of the instant invention is illustrated and generally indicated at 10 in FIGS. 1–7. As will hereinafter be more fully described, the belt shortening device 10 is particularly useful for taking up slack in a seat belt 12 used to secure a baby seat 14 on the seat 16 of a vehicle. The device 10 is specifically constructed and arranged so that it can be easily mounted to an existing vehicle seat belt 12 without detaching the belt 12 from its existing connections (not shown). Unless otherwise indicated herein, it is to be understood that the individual component parts of the device are preferably molded from suitable rigid plastic material. Alternatively, the components could be machined or cast from metal materials.

More specifically, the belt shortening device 10 includes a flat rectangular housing generally indicated at 18, and first and second take up arms generally indicated at 20, 22 slidably mounted within the housing 18.

The housing 18 is preferably formed in two opposing section halves, generally indicated at 24, 26. These halves matingly engage to define top and bottom opposing walls 28, 30 respectively, a continuous side wall 32 extending therebetween, and an interior space in which the mechanical portions of the device are housed. The mating halves 24, 26 further cooperate to define spaced transverse slots 34, 36 extending across the top wall 28.

The take up arms 20, 22 each consist of a body portion 38, 40 having inner and outer ends, and an elongated rack member 42, 44 having a first end pivotably mounted to the inner end of the respective body portion. The outer end of each body portion 38, 40 includes a transverse slot 46, 48 for receiving the seat belt 12 therein. The rack members 42, 44 each include a plurality of ratchet teeth 50, 52 which are used to move the take up arms 20, 22 and to lock the take up arms in place. The rack members 42, 44 extend longitudinally in opposing directions within the housing 18 with the first take up arm 20 being positioned adjacent to the top wall 28 of the housing 18 and the second take up arm 22 positioned adjacent to the bottom wall 30 of the housing 18. As seen in the drawings, the body portion 38 of the first take up arm 20 is noticeably shorter than the body portion 40 of the second take up arm 22. In operation, the take up arms 20, 22 are slidably movable within the housing 18 between an extended position wherein the slotted body portions 38, 40 of the take up arms 20, 22 extend outside of the housing 18 through the slots 34, 36 in the top wall 28 (See FIGS. 1–3), and a withdrawn position wherein the slotted body portions 38, 40 of the take up arms 20, 22 are withdrawn inside the housing (see FIGS. 4–5).

Movement of the rack members 42, 44 is controlled by a pinion gear 54 mounted on a rotatable shaft 56 that extends transversely through the interior or the housing 18. The inner end of the shaft 56 is rotatably seated in a formation 58 formed in the inner surface of the side wall 32. The outer end of the shaft 56 extends through an opening 60 in the opposing side wall portion and includes a handle 62 mounted thereon to facilitate rotation of the shaft 56 and pinion gear 54. In this regard, rotation of the shaft 56 causes a corresponding linear movement of the rack members 42, 44 within the housing 18 (see FIGS. 4–5).

Figure 6:
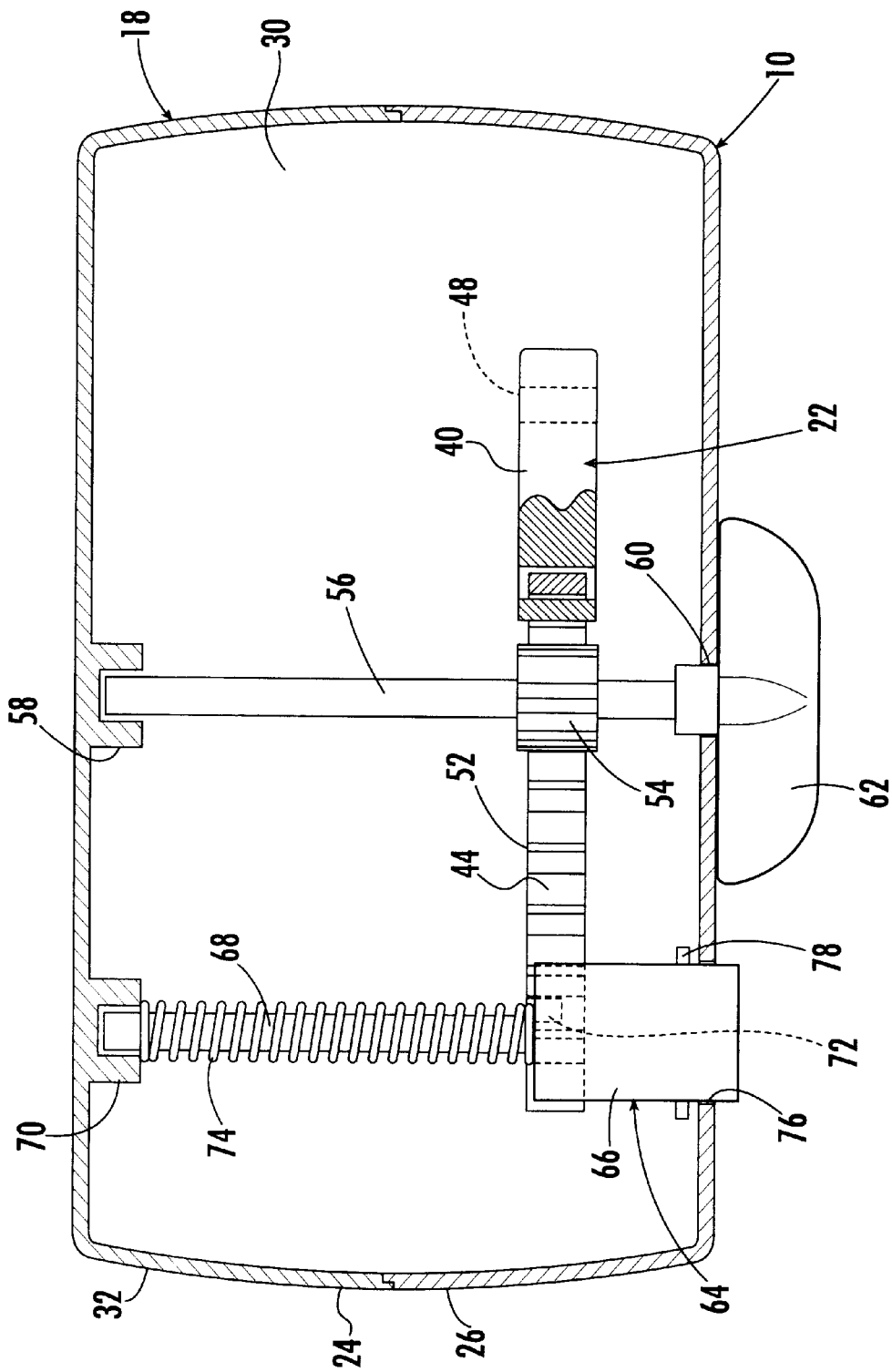
FIG. 6 is another cross-sectional view as taken along line 6—6 of FIG. 1.

A locking ratchet pawl generally indicated at 64 releasably engages the rack members 42, 44 for selectively locking the rack members in a fixed position. More specifically, the ratchet pawl 64 includes a body portion 66 that is slidably mounted on a shaft 68 that extends transversely through interior of the housing 18. One end of the shaft 68 is supported in a formation 70 on the inside of the housing 18, while the opposing end of the shaft 68 is supported by the body portion 66 of the ratchet pawl 64. A single ratchet tooth 72 extends downwardly from the body portion 66 and engages with the teeth 52 on the second rack member 44 to prevent reverse movement of the racks 42, 44 once advanced to a particular location. The body portion 66 is normally biased by a spring 74 to the engaged position as shown in FIG. 6, i.e. positioned immediately adjacent the forward side wall of the housing. The body portion 66 of the ratchet pawl 64 extends outwardly from the housing 18 through an opening 76 in the forward side wall. The body portion 66 is held within the housing by a flange 78 on the side of the body portion 66. The flange 78 engages the inner surface of the side wall 32 and prevents the body portion 66 from being pushed out of the housing. The body portion 66 is slidably movable inwardly along the length of the shaft 68 to disengage the ratchet tooth 72 from the teeth 52 of the rack member 44. In this regard, inward depression (see arrow 80) of the body portion 66 moves the ratchet pawl 64 inwardly, out of engagement with the rack member 44.

Figure 6A:
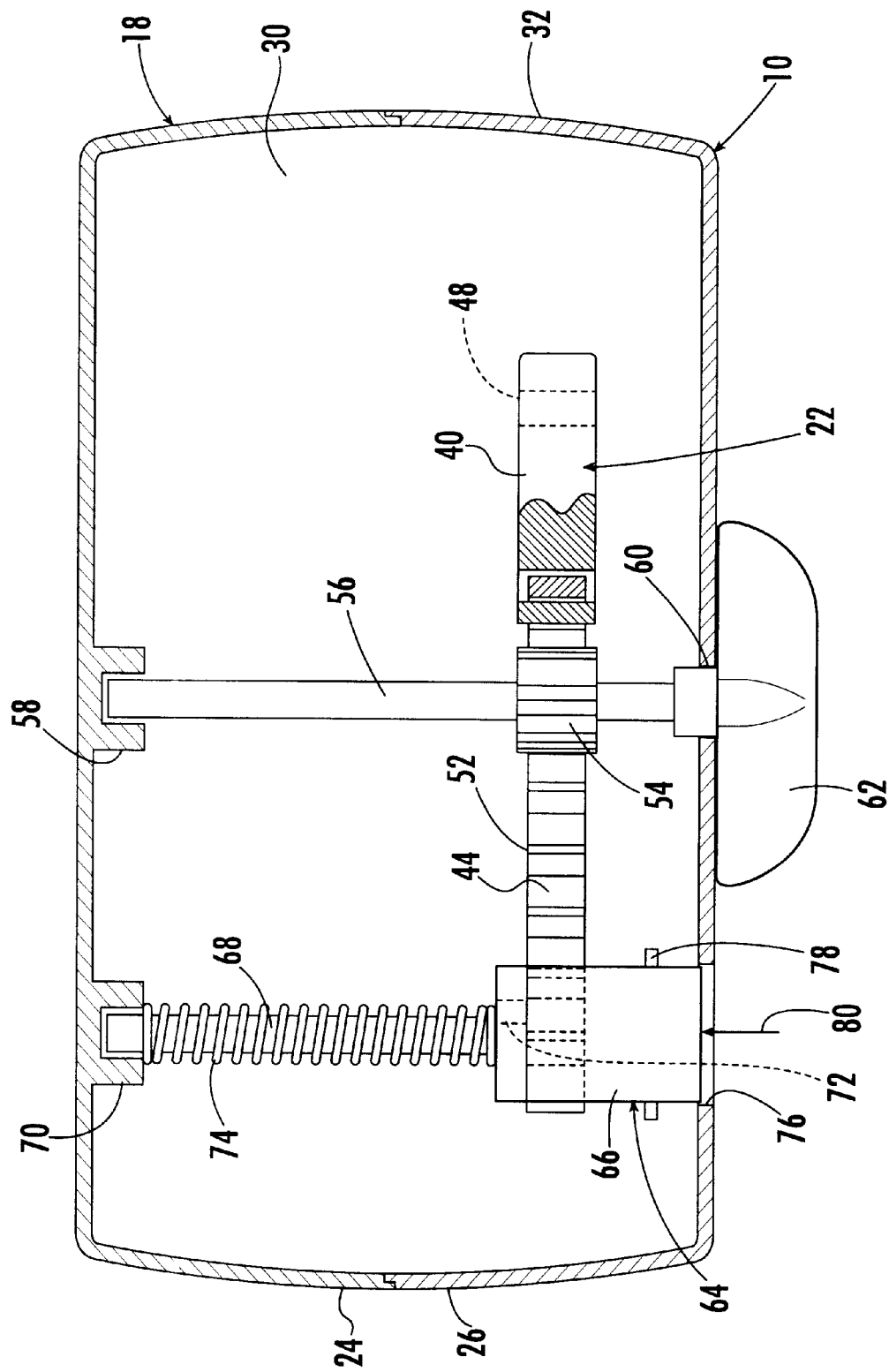
FIG. 6A is another cross-sectional view showing inward movement of the ratchet pawl.
Figure 7:
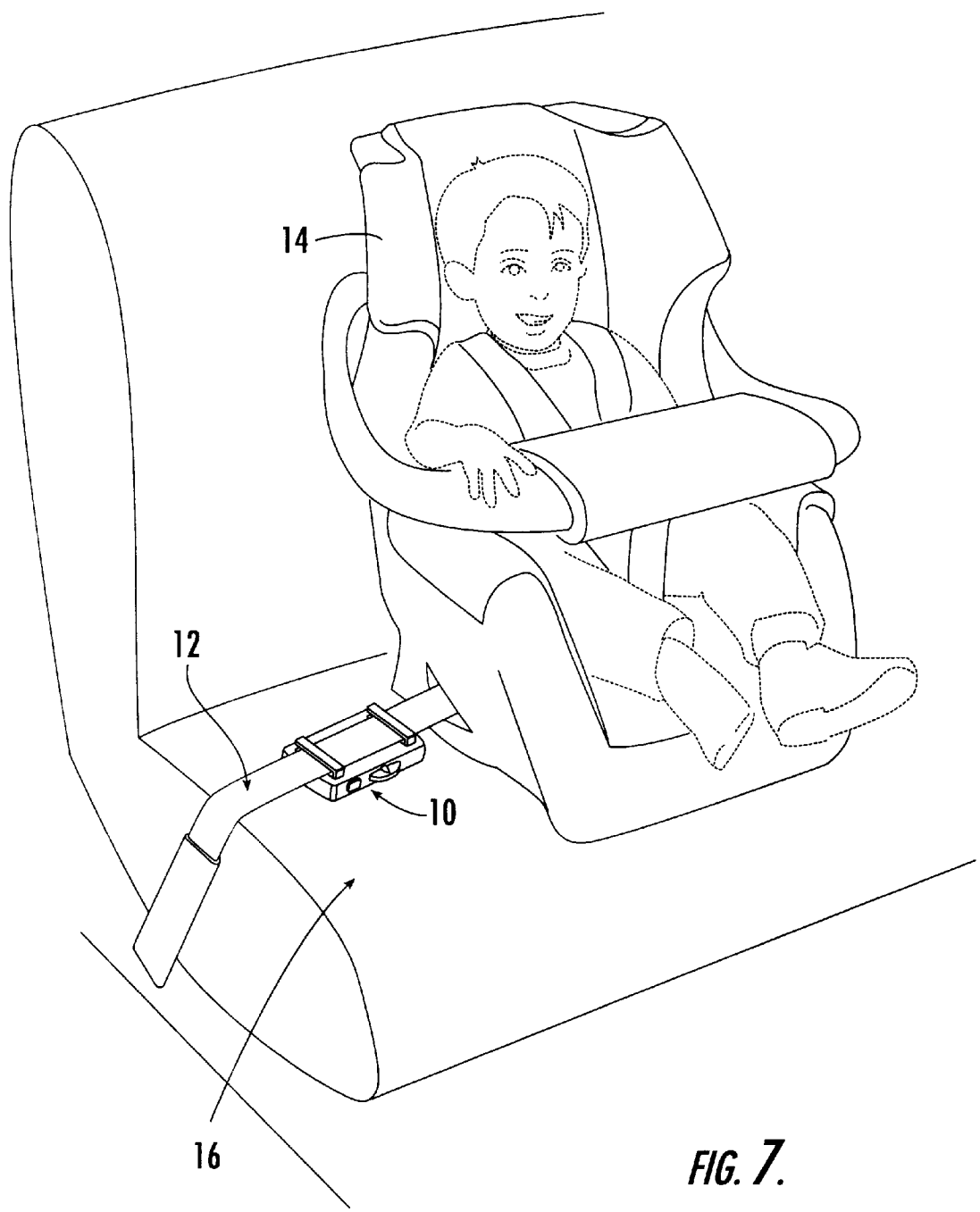
FIG. 7 is a perspective view of a baby seat as mounted on a vehicle seat and the belt shortening device mounted on the webbing of the seat belt.

In use, the take up arms 20, 22 are moved to the extended position and the seat belt 12 is transversely received within the slots 46, 48 of the take up arms 20, 22 outside the housing 18. Thereafter the shaft 56 is rotatable relative to housing 1, to slidably move the rack members 42, 44 within the housing and withdraw the body portions 38, 40 of the take up arms 20, 22 into the housing to take up excess slack in the belt 12. The ratchet pawl 64 holds the rack members 42, 44 in place to prevent inadvertent loosening of the belt. When it is desired to release the belt shortening device 10, the pawl 64 is moved inwardly to the release position (FIG. 6A) and the rack members 42, 44 are free to move back to their extended positions.

It can therefore be seen that the instant invention provides a unique and improved belt shortening device that can remove unwanted slack in a vehicle seat belt that it used to secure a baby seat in a vehicle. The use of two take up arms mounted in opposed relation within a compact device provides simplicity of design and ease of use. The simple design and use of proven ratchet mechanisms further provide for an inexpensive and compact device. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A belt shortening device comprising:

a housing having top and bottom walls and a side wall extending between said top and bottom walls, said top wall including first and second spaced slots extending transversely across said top wall;

first and second take up arms slidably mounted within said housing, said first and second take up arms each comprising a body portion having inner and outer ends, said outer end having a transverse slot therein for receiving a seat belt therein, said first and second take up arms each further comprising a rack member having a first end pivotably mounted to the inner end of said body portion, said rack members extending longitudinally in opposing directions within said housing, said first and second take up arms being movable between an extended position wherein the outer ends of the first and second take up arms respectively extend outside of the housing through said first and second slots in said top wall, and a withdrawn position wherein the outer ends of the first and second take up arms are withdrawn inside the housing, a pinion mounted on a rotatable shaft extending transversely through said housing, said shaft having an end portion that extends outwardly through said housing, said end portion of said shaft having a handle mounted thereon, said pinion engaging with said rack members of said first and second take ups arms wherein rotation of said shaft causes rotation of said pinion and corresponding linear movement of said rack members in opposing directions, a ratchet pawl movably mounted in the side wall of the housing, said ratchet pawl releasably engaging at least one of said rack members for selectively locking said rack members in a fixed position, said ratchet pawl being selectively movable between said engaged position and a release position, said seat belt being transversely received within the slots of said first and second take up arms when said take up arms are in said extended position, said shaft being rotatable relative to housing to slidably move said rack members and draw said body portions of said take up arms into said housing to take up excess slack in said belt.

2. The belt shortening device of claim 1 wherein said housing is generally rectangular in shape.

3. The belt shortening device of claim 1 wherein said rack member of said first take up arm is positioned adjacent to said top wall and said rack member of said second take up arms is positioned adjacent to said bottom wall.

4. The belt shortening device of claim 3 wherein said body portion of said first take up arm is shorter in length than said body portion of said second take up arm.

* * * * *